Patented Dec. 30, 1941

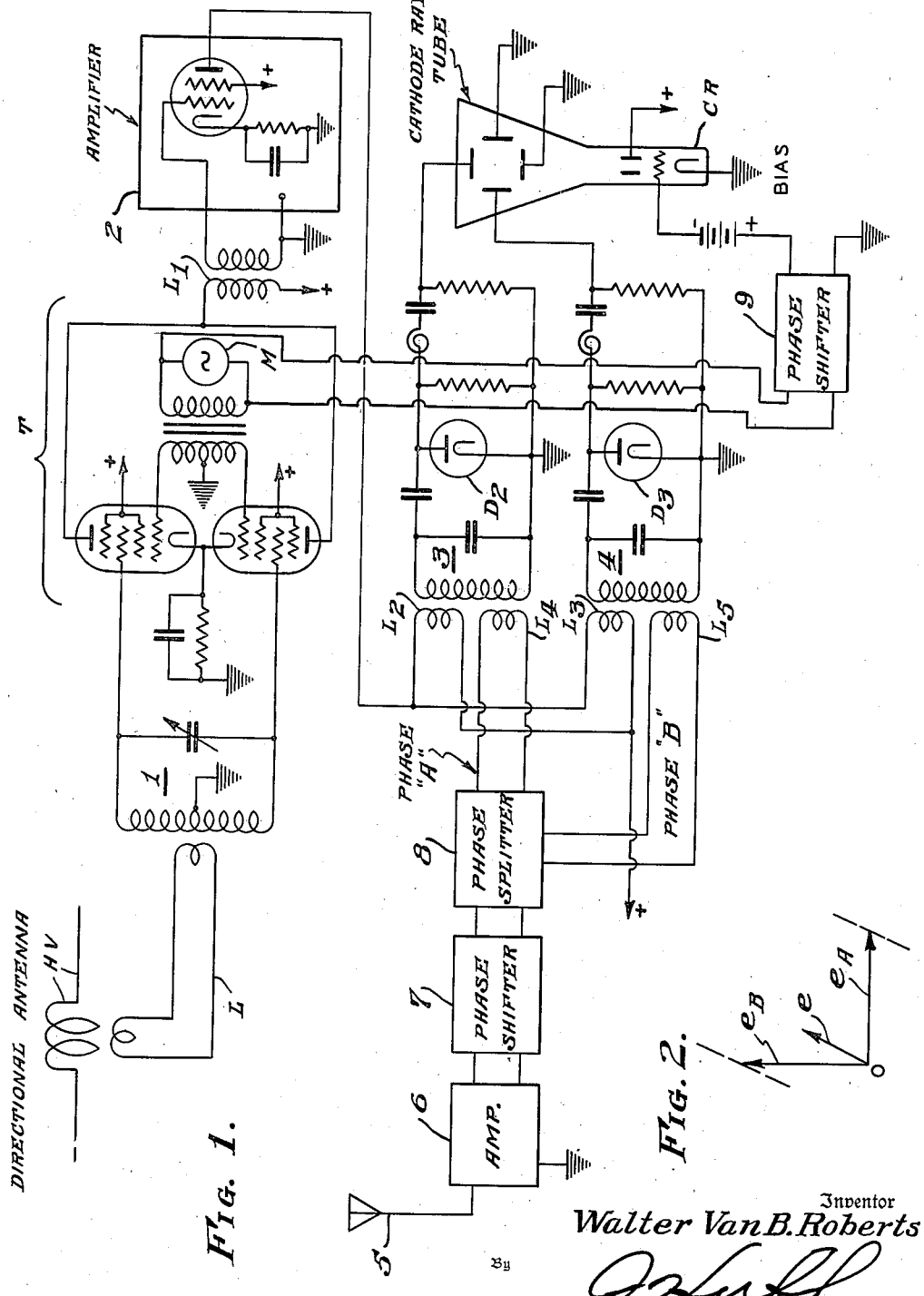

2,268,085

UNITED STATES PATENT OFFICE 2,268,085

RADIO DIRECTION FINDER

Walter van B. Roberts, Princeton, N. J., assignor to Radio Corporation of America, a corporation of Delaware Application October 12, 1939, Serial No. 299,200

8 Claims. (Cl. 250—11)

This invention relates to radio direction finders generally and particularly to an arrangement for indicating the direction of the location of a radio transmitter in two intersecting planes.

One of the objects of the invention is to provide means for indicating simultaneously both the horizontal and vertical deviations between the axis of a directive antenna and the direction from the antenna to a source of plane polarized radio waves. Another object is to provide means for indicating the electric and magnetic field components of a radio wave to indicate the wave source. An additional object is to provide means for indicating the deviation and sense of deviation between the axis of an antenna system and a line from the antenna through the wave source.

The operation of the invention will be best understood by reference to the accompanying drawing in which Figure 1 is a schematic diagram representing the circuit arrangement of the invention and Figure 2 is a vector diagram of certain voltage relations existing in the aforesaid circuit.

Referring to Fig. 1, the reference character HV indicates a directional antenna comprising an open or dipole portion adapted to derive voltages from radio waves whose electric vector has a component parallel to said open portion and a closed or loop antenna portion adapted to derive voltages from radio waves whose magnetic vector has a component parallel to the loop axis. Preferably, the relative dimensions of these two portions are so chosen that the total voltage picked up by the composite antenna, when the axis of the structure makes a given angle with the direction of propagation of the waves, is the same for all possible "clock positions" of the antenna axis. While this condition will be met exactly only at a single frequency, over a small range of frequencies it may be attained sufficiently closely for practical purposes. This limitation is due to the fact that the relative voltage pickups of the two antenna portions varies with frequency. It is furthermore preferable to so dimension the two portions that the system is resonant at or near the desired frequency of operation. A link circuit L is employed to transfer energy picked up by the antenna system to the resonant circuit 1. Thus there is produced in circuit 1 a signal voltage whose magnitude is determined by the angle between the antenna axis and the direction of propagation of the incoming signal waves but whose phase is determined by the "clock position" or "sense" of the deviation. The term "clock position" as here used may be explained as follows: If the antenna axis is pointed slightly to the right of the source of signals, the clock position is said to be 3 o'clock, while, if it is pointed below the source, it is at 6 o'clock, and so on.

The voltage developed in circuit 1 is impressed on a differential translating and modulating device T whereby in the balanced condition of the device no current flows in coil L1 connected in its output. However, the device T is periodically unbalanced by the application of a differential or modulating voltage which is derived from a relatively low frequency alternating voltage source M. Thus, the current through L1 is varied sinusoidally in magnitude between alternately positive and negative limits; that is, its polarity is periodically reversed as its magnitude passes through zero. The voltage developed by this current is amplified by means of an amplifier 2 and impressed by way of transformer primaries L2 and L3 upon resonant circuits 3 and 4. At the same time, these two resonant circuits are supplied with relatively large and substantially equal quadrature voltages derived from a nondirectional antenna 5, amplifier 6, phase shifter 7 and phase splitter 8. The equal quadrature voltages are applied by way of coils L4 and L5 to the resonant circuits 3, 4 respectively. It will at this point be advisable to indicate the nature of the total voltages developed in the resonant circuits 3 and 4.

Referring to Fig. 2, the vector $e_A$ represents the nondirectional voltage component in circuit 3, while the vector $e_B$ represents the nondirectional voltage in circuit 4. The vector $e$ represents the relatively small signal frequency voltage impressed on both of the circuits 3 and 4 at a given instant. Since this voltage $e$ is continually varying in magnitude, as explained above, the resultant voltage in each of the circuits 3 and 4 may be represented by a vector extending from the point 0 to one of the dash lines whose direction is the same as that of $e$. As $e$ varies in magnitude, the resultant vector moves back and forth along the appropriate dash line. Thus, it is seen that if $e$ is small compared to $e_A$ and $e_B$, the amplitude variation of the resultant voltage in circuit 3 will be determined by the component of $e$ that is in phase with $e_A$ while the amplitude variation of the resultant voltage in circuit 4 will be determined by the component of $e$ that is in phase with $e_B$.

The resultant voltage in circuit 3 is impressed on a diode rectifier D2 and the alternating current output of this diode is impressed on a vertical deflection element of cathode ray tube CR. Thus the low frequency voltage component on these plates is in phase with the voltage of source M; the magnitude is determined by the component of $e$ that is in phase with $e_A$. Similarly, a low frequency voltage component is impressed on the horizontal deflection elements of the cathode ray tube CR. This low frequency voltage component is also in phase with the voltage from the source M; the magnitude is determined by the component of $e$ that is in phase with $e_B$. Since the two deflection voltages on the deflecting elements have like phase, the cathode ray spot will trace a straight line whose inclination is determined by the relative magnitudes of the deflection voltages. Hence the clock position of this line has an angular value that depends linearly on the angular position of the vector $e$. But as explained before, the angular position of $e$, that is to say the phase of $e$, is determined by the clock position of the deviation between the antenna axis and the direction of signal propagation. Hence, finally, the clock position of the cathode ray trace varies linearly with the clock position of this deviation while the length of the trace is determined by the magnitude of the deviation.

For convenience in reading, it is desirable that the clock position of the trace should coincide with that of the antenna. This may be most easily arranged by adjusting the phase of the nondirectional voltage by means of the phase shifter 7 following amplifier 6 in the nondirectional channel. This may be done by pointing the antenna HV directly at the source as indicated by the length of the cathode ray trace shrinking to a single spot. Then the antenna is swung in a known direction, say to the right, so as to cause an extended linear trace. Then the phase adjuster is operated to make the trace horizontal. However, a mere horizontal trace does not indicate whether the deviation is right or left.

In order to indicate "sense," a voltage derived from the same low frequency source M is applied, together with a constant biasing voltage, to the cathode ray tube grid so as to cause unequal brightness on the two halves of the trace. A constant negative bias may be used that is sufficiently large so that only near the positive peak of the variable voltage on the grid does the cathode ray spot show at all. In this case the phase shifter 9, shown between the source M and the grid, may be omitted as the grid voltage will be at a maximum simultaneously with the position of the spot and all that is necessary is to choose the polarity of the voltage applied to the grid such as to give the desired sense indication.

While, for the purpose of simplifying the explanation, it was assumed that amplification of the signal voltage was performed at signal frequency, it will be understood that the same results will be obtained if both the directional and nondirectional voltages are changed in frequency by a common heterodyne oscillator, as is well known to those skilled in the art. The frequency change may be performed either before or after the differentiating and modulating step performed by the device T.

It will be understood that, while a particular form of antenna has been described, the invention may equally well make use of any other sort of antenna system which will pick up and transfer to a utilization circuit a voltage whose phase is substantially determined by the clock position or sense of deviation, while its magnitude is substantially independent of clock position but determined by the magnitude of the deviation. The invention is useful in the instrument landing of aircraft, in the determination of the location of radio transmitters, especially on aircraft in flight, in indications of radio wave propagation, and in like uses.

What is claimed is:

1. A radio direction finder including in combination an antenna system responsive to radio waves to obtain voltages therefrom, said voltages having a magnitude determined by the magnitude of the deviation between the line of wave propagation and the axial line of said antenna system and having a phase determined by the sense of said deviation, means for modulating said voltages, means for deriving from said waves a voltage independent of said deviations, means for obtaining voltages of quadrature phase from said last-mentioned voltage, a pair of detectors, means for applying said modulated voltages and one of said quadrature phase voltages to each of said detectors respectively, and means connected to the outputs of said detectors for indicating the direction of the source of said radio waves in terms of horizontal and vertical coordinates as a function of the output voltages of said detectors.

2. A radio direction finder including in combination an antenna system including a loop and a dipole arranged so that the loop connects the elements of the dipole and has its axis in substantial alignment with the axis of the dipole, said antenna system deriving voltages from the waves whose source is to be indicated, said voltages having a magnitude determined by the magnitude of the deviation between the line of wave propagation and the axial line of said antenna and having a phase determined by the sense of said deviation, means for modulating said voltages, means for deriving from said waves a voltage independent of said deviations, means for obtaining voltages of quadrature phase from said last-mentioned voltage, a pair of detectors, means for applying said modulated voltages and one of said quadrature phase voltages to each of said detectors respectively, and means connected to the outputs of said detectors for indicating the direction of the source of said radio waves in terms of horizontal and vertical coordinates as a function of the output voltages of said detectors.

3. A radio direction finder including in combination an antenna system responsive to radio waves to obtain voltages therefrom, said voltages having a magnitude determined by the magnitude of the deviation between the line of wave propagation and the axial line of said antenna system and having a phase determined by the sense of said deviation, means for modulating said voltages, means for deriving from said waves a voltage independent of said deviations, means for obtaining voltages of quadrature phase from said last-mentioned voltage, a pair of detectors, means for applying said modulated voltages and one of said quadrature phase voltages to each of said detectors respectively, and a cathode ray tube having pairs of deflecting elements, said pairs being connected respectively to the outputs of said detectors for indicating the source of said radio waves in terms of horizontal and vertical coordinates as a function of the output voltages of said detectors and the resulting cathode ray trace compared to horizontal and vertical coordinates.

4. In a device of the character of claim 1, means, including said means for modulating, for deriving and applying a modulating voltage to said indicating means to indicate the sense of the directional deviation.

5. In a device of the character of claim 3, means, including said means for modulating, for deriving and applying a modulating voltage to vary the intensity of said cathode ray to provide a sense indication.

6. A radio wave source indicator including an antenna system for deriving from said wave voltages having a magnitude determined by the deviation between the line of propagation of said wave and the axial line of said antenna system and having a phase determined by the sense of said deviation, means for applying said voltages to a balanced modulator, a source of modulation voltages, means for applying said modulation voltages to said modulator, a nondirectional antenna for deriving voltages from said wave, means for obtaining from said last-mentioned voltages radio frequency voltages of quadrature phase, a pair of detectors, means for applying voltages from said balanced modulator to said detectors, means for applying to said detectors respectively said radio frequency voltages of quadrature phase, a cathode ray tube having pairs of deflecting elements, and means connecting one of said pairs of deflecting elements to one of said detectors and the other of said pairs of deflecting elements to the other of said detectors whereby said cathode ray is deflected as a function of the output voltages of said detectors to indicate the wave source in terms of horizontal and vertical coordinates.

7. In an indicator of the character of claim 6, means for varying the intensity of said cathode ray and means for applying said modulation voltages to said cathode ray intensity varying means to indicate the sense of the direction of said wave source.

8. In a direction indicating system, the combination of an antenna system adapted to pick up a signal voltage whose magnitude is determined by the magnitude of the deviation between the direction of signal propagation and a line determined by said antenna system but whose phase is determined by the orientation of said deviation, means for amplifying said voltage, means for periodically varying the amplitude of said voltage, a pair of detectors, means for applying said amplified voltage to said detectors, a nondirectional antenna and means for deriving therefrom two phases of signal frequency voltages, connections for applying one of said phases to one of said detectors and connections for applying the other of said phases to the other of said detectors and a single means connected to the outputs of said detectors for indicating the relative magnitudes of the output voltages of said detectors.

WALTER van B. ROBERTS.